United States Patent
Kornegay et al.

(10) Patent No.: US 8,812,793 B2
(45) Date of Patent: Aug. 19, 2014

(54) SILENT INVALID STATE TRANSITION HANDLING IN AN SMP ENVIRONMENT

(75) Inventors: Marcus L. Kornegay, Morrisville, NC (US); Ngan N. Pham, Raleigh, NC (US); Brian T. Vanderpool, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 11/425,011

(22) Filed: Jun. 19, 2006

(65) Prior Publication Data
US 2007/0294484 A1    Dec. 20, 2007

(51) Int. Cl.
*G06F 12/12*    (2006.01)

(52) U.S. Cl.
USPC ............... 711/146; 711/121; 711/E12.034

(58) Field of Classification Search
USPC .................. 711/146, 121, E12.034
See application file for complete search history.

(56) References Cited

U.S. PATENT DOCUMENTS

| | | | |
|---|---|---|---|
| 5,913,215 A * | 6/1999 | Rubinstein et al. | 707/10 |
| 7,469,321 B2 * | 12/2008 | Heller, Jr. | 711/141 |
| 2004/0088494 A1 * | 5/2004 | Glasco et al. | 711/141 |

OTHER PUBLICATIONS

Sorin, Daniel J., et al; Specifying and Verifying a Broadcast and a Multicast Snooping Cache Coherence Protocol; IEEE Transactions on Parallel and Distributed Systems; v. 13, n.6, pp. 1-23, Jun. 2002.
Acacio, Manuel E., et al; An Architecture for High-Performance Scalable Shared-Memory Multiprocessors Exploiting On-Chip Integration; IEEE Transactions on Parallel and Distributed Systems; v. 15, n.8, pp. 755-768, Aug. 2004.

* cited by examiner

*Primary Examiner* — Jared Rutz
(74) *Attorney, Agent, or Firm* — Steven M. Greenberg, Esq.; CRGO Law

(57) ABSTRACT

Embodiments of the invention address deficiencies of the art in respect to cache coherency management and provide a novel and non-obvious method, system and apparatus for silent invalid state transition handling in an SMP environment. In one embodiment of the invention, a cache coherency method can be provided. The cache coherency method can include identifying an invalid state transition for a cache line in a local node, evicting a corresponding cache directory entry for the cache line, forwarding an invalid state transition notification to a node controller for a home node for the cache line in order for the home node to evict a corresponding cache directory entry for the cache line, and relinquishing ownership of the cache line to the home node.

9 Claims, 2 Drawing Sheets

SILENT INVALID STATE TRANSITION HANDLING IN AN SMP ENVIRONMENT

BACKGROUND OF THE INVENTION

1. Field of the Invention

The present invention relates to the field of symmetric multiprocessing (SMP) systems and more particularly to cache line management for SMP systems.

2. Description of the Related Art

SMP systems refer generally to computing platforms having multiple processing units coupled to one another over a high speed bus. SMP systems have proven highly effective in the concurrent processing of computing tasks in order to accelerate computing performance for the system as a whole. SMP systems can range from the loosely coupled to the tightly coupled. In a loosely coupled SMP system, each processing unit stands alone and shares common memory and communications resources. Notably, in the loosely coupled system, each processing unit can handle any processing task. By comparison, in a tightly coupled SMP system, the processing units are grouped together and each processing unit can be designated a particular type of task.

Just as in the case of a single processing environment, in an SMP environment, data caching can have a dramatic impact on the speed at which processing tasks can be performed. In the SMP environment unlike the single processing environment, however, substantial challenges exist in the coordination and management of data caching across multiple data caches for multiple, different processing units. Coordinating and managing data caching across multiple data caches in order to ensure consistency among cache lines possibly accessed within different computing nodes has come to be referred to as the practice of cache coherence.

An SMP system generally employs a "snoopy" mechanism to ensure cache coherence. In operation, when a cache miss occurs, the requesting cache sends a cache request to main memory and to all of its peer caches. When a peer cache receives the cache request, the peer cache "snoops" its cache directory and produces a cache snoop response indicating whether the requested data is found and the state of the corresponding cache line. If the requested data is found in a peer cache, the peer cache can source the data to the requesting cache via a cache-to-cache transfer. The memory is responsible for supplying the requested data if the data cannot be supplied by any peer cache. In this way, cache coherence can be achieved by inspecting all caches in the SMP system before responding to a data request.

There are many techniques for achieving cache coherence that are known to those skilled in the art. A number of snoopy cache coherence protocols have been proposed including the Modified Exclusive Shared Invalid (MESI) coherence protocol. MESI defines four cache states: modified (M), exclusive (E), shared (S) and invalid (I). In the invalid state, associated data is not valid, whereas in the shared state, associated data is valid, and can also be valid in the caches of other nodes. The shared state is entered when the data is sourced from the memory or another cache in the modified state, and a corresponding snoop response shows that the data is valid in at least one of the other caches. In an exclusive state, associated data is valid, and has not been modified. Yet, the associated data is exclusively owned, and cannot be valid in another cache. The exclusive state is entered when the associated data is sourced from the memory or another cache in the modified state, and the corresponding snoop response shows that the data is not valid in another cache. Finally, in a modified state, associated data is valid and has been modified. Yet as before, the data is exclusively owned and cannot be valid in another cache.

In practice, in an SMP system a cache line requested for use by a peer cache in a local node can be managed as between the node controllers for the home node and local node corresponding to the peer caches. Normally, once a peer cache in a local node has obtained a copy of a cache line remotely, the requesting processor in the local node can utilize the cache line in the peer cache and eventually, the processor can drop the cache line resulting in a state transition for the cache line from exclusive to invalid, as it is well-known in the art.

In as much as the different node controllers for the different nodes in an SMP system do not communicate with one another, all of the node controllers excepting for the node controller for the local cache will remain oblivious to the occurrence of the silent invalid state transition for the cache line in a local node. Rather, only when a subsequent request for the cache line is processed by the node controller for the cache in the home node will the other node controllers become aware of the invalid state for the cache line. Consequently, substantial latencies can result and the local directories for the different node controllers will needlessly waste storage space storing an entry for the invalid cache line.

BRIEF SUMMARY OF THE INVENTION

Embodiments of the invention address deficiencies of the art in respect to cache coherency management and provide a novel and non-obvious method, system and apparatus for silent invalid state transition handling in an SMP environment. In one embodiment of the invention, a cache coherency method can be provided. The cache coherency method can include identifying an invalid state transition for a cache line in a local node, evicting a corresponding cache directory entry for the cache line, forwarding an invalid state transition notification to a node controller for a home node for the cache line in order for the home node to evict a corresponding cache directory entry for the cache line, and relinquishing ownership of the cache line to the home node.

In another embodiment of the invention, an SMP system can be provided. The SMP system can include multiple nodes, each including a node controller and several processors cross-coupled to one another. The SMP system also can include at least one cache directory coupled to each node controller. Finally, the SMP system can include invalid state transition logic coupled to each node controller. The invalid state transition logic can include program code enabled to identify an invalid state transition for a cache line in a local node, to evict a corresponding cache directory entry for the cache line, and to forward an invalid state transition notification to a node controller for a home node for the cache line in order for the home node to evict a corresponding cache directory entry for the cache line.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide a method, system and computer program product for silent invalid state transition handling in an SMP environment. In accordance with an embodiment of the present invention, whenever a cache line in cache of a local node of an SMP system transitions to an invalid state, the node controller for the local node can notify the node controller for the home node of the cache line. In response, both node controllers can evict the cache line from respective directories. In this way, in a subsequent request for the cache line no latencies will arise from detecting a silent state transition for the requested cache line. Furthermore, the directories for the respective node controllers will not needlessly store entries for the invalid cache line.

Figure 1:
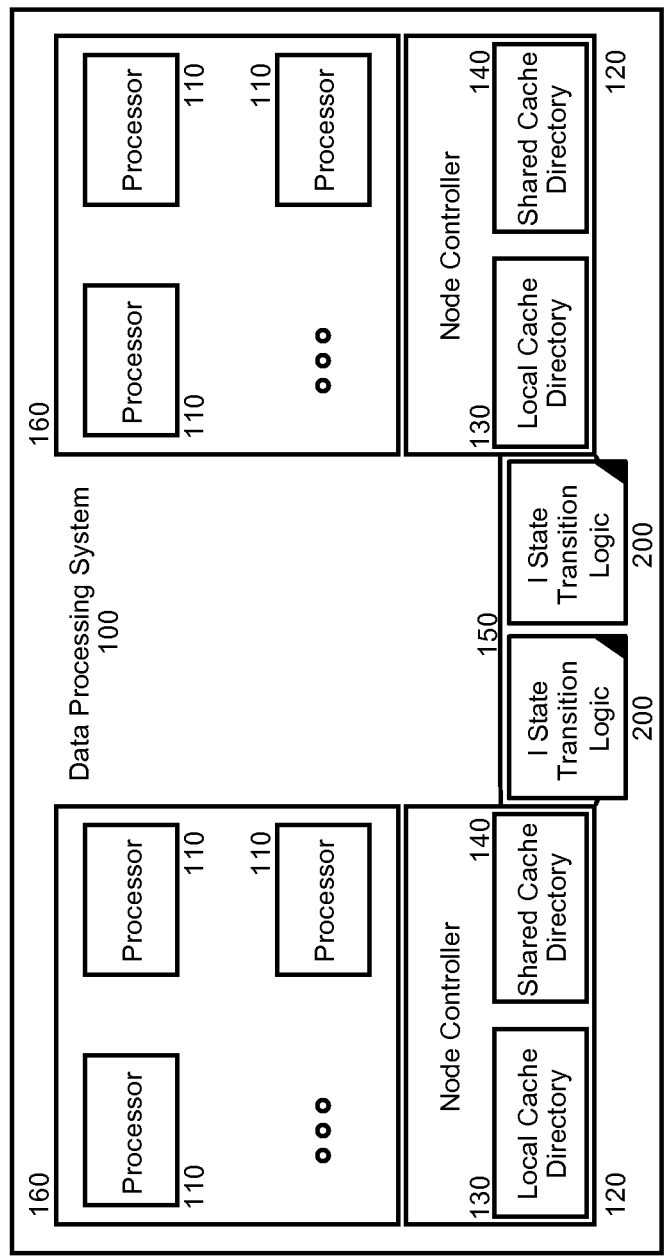
FIG. 1 is a schematic illustration of an SMP system configured for silent invalid state transition handling; and, FIGS. 2A and 2B, taken together, are a flow chart illustrating a process for silent invalid state transition handling in an SMP environment.

In further illustration, FIG. 1 is a schematic illustration of an SMP system configured for silent invalid state transition handling. An SMP system 100 can include one or more processor nodes 160, each of the processor nodes 160 including one or more processors 110 coupled to one another over a central processing unit (CPU) bus and coordinated to execute instructions as provided by a hosted operating system or application logic (not shown). Each of the nodes 160 can include a node controller 120 and each node controller 120 can include firmware logic including program code enabled to decode control information and address information for access requests issue by one or more of the processors 110 in the node 160, or by other devices coupled to the node 160. Notably, the SMP system 100 can implement the MESI protocol for cache coherency.

Each node controller 120 can be coupled to a corresponding cache directory 130 and a corresponding shared cache directory 140. The local cache directory 130 can include directory listings for cache lines disposed locally irrespective of whether the corresponding node 160 is a home node or a local node for the cache lines. The shared cache directory 140, in contrast, can include a directory of cache lines disposed locally where the corresponding node 160 is a home node for the cache lines.

Notably, invalid state transition logic 200 can be coupled to each node controller 120. The invalid state transition logic 200 can include program code enabled to receive a notification of an invalid state transition for a particular cache line from a processor 110 in the node 160. The program code further can be enabled to broadcast the state transition to other coupled node controllers 120. Each of the node controllers 120, upon receiving notification of an invalid state transition for a cache line, can eject the cache line from respective ones of the local cache directory 130 and shared cache directory 140 as the case may be.

Figure 2A:
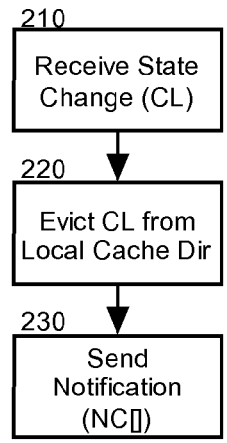
Figure 2B:
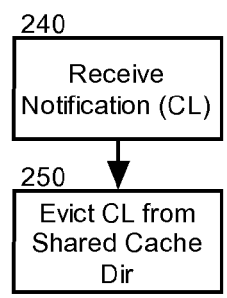

In more particular illustration of the operation of the invalid state transition logic, FIGS. 2A and 2B, taken together, are a flow chart illustrating a process for silent invalid state transition handling in an SMP environment. Considering first the process shown in FIG. 2A, beginning in block 210 a state change notification can be received in respect to a particular cache line. The state change notification can be issued by a processor with a node acting as a local node for the cache line, and received by a corresponding node controller for the node.

Responsive to receiving the state change notification, in block 220 the node controller can evict the cache line from the local cache directory for the node. Thereafter, in block 230 a notification can be forwarded to the node controller for the home node of the cache line. In this regard, the notification can be forwarded directly to the node controller for the home node of the cache line, or the notification can be broadcast to all node controllers in the SMP system thereby assuring that the home node receives the notification without maintaining an awareness of the identity for any one home node for a cache line.

It is to be noted, however, that a copy of the cache line can be selectively retained by the node controller for a local node rather than relinquishing ownership to the home node where an inadvertent invalid state transition has been detected. In particular, recognizing that particular command types often give rise to the invalid state transition such as a bus read partial (BRP), the detection of the command type can cause the retention of a copy of the cache line without relinquishing ownership to the home node in order to achieve faster processing speed for a subsequent request for the cache line in the local node.

Turning now to FIG. 2B, in block 240 a node controller for home node can receive a notification from a node controller for a local node that an invalid state transition has occurred for a cache line and that the cache line is no longer valid in the local node domain. In response, in block 250 the node controller for the home node of the cache line can evict an entry for the cache line from the shared cache directory. In this way, when a processor seeks a copy of the cache line, all local caching agents will respond with a clean snoop response and the requesting processor will retrieve a copy of the cache line from the cache of the home node.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A cache coherency method comprising:
   identifying an invalid state transition for a cache line in a local node;
   evicting a corresponding cache directory entry for the cache line;
   forwarding an invalid state transition notification to a node controller for a home node for the cache line in order for the home node to evict a corresponding cache directory entry for the cache line;
   detecting a particular command type giving rise to the invalid state transition; and,
   retaining a copy of the cache line in the local node.

2. The method of claim 1, wherein detecting a particular command type giving rise to the invalid state transition, comprises detecting a bus read partial (BRP) command type giving rise to the invalid state transition.

3. The method of claim 1, wherein the evicting comprises evicting a corresponding local cache directory entry for the cache line.

4. A symmetric multiprocessing (SMP) system comprising:
   a plurality of nodes, each of the nodes comprising a node controller and a plurality of processors cross-coupled to one another;
   at least one cache directory coupled to each node controller; and,
   invalid state transition logic coupled to each node controller, the invalid state transition logic comprising program code enabled to
      identify, in a local node, an invalid state transition for a cache line in the local node,
      evict a corresponding cache directory entry, stored in the local node, for the cache line,
      forward an invalid state transition notification, to a node controller for a home node for the cache line in the SMP system, in order for the home node to evict a corresponding cache directory entry for the cache line,
      to detect a particular command type giving rise to the invalid state transition; and,
      to retain a copy of the cache line in the local node.

5. The SMP system of claim 4, wherein the at least one cache directory comprises at least one of a local cache directory and a shared cache directory.

6. The SMP system of claim 4, wherein the SMP system implements the Modified Exclusive Shared Invalid (MESI) cache coherency protocol.

7. A computer program product comprising a computer usable tangible device comprising a memory device embodying computer usable program code for cache coherency, the computer program product comprising:
   computer usable program code for identifying an invalid state transition for a cache line in a local node;
   computer usable program code for evicting a corresponding cache directory entry for the cache line;
   computer usable program code for forwarding an invalid state transition notification to a node controller for a home node for the cache line in order for the home node to evict a corresponding cache directory entry for the cache line;
   computer usable program code for detecting a particular command type giving rise to the invalid state transition; and,
   computer usable program code for retaining a copy of the cache line in the local node.

8. The computer program product of claim 7, wherein the computer usable program code for detecting a particular command type giving rise to the invalid state transition, comprises computer usable program code for detecting a bus read partial (BRP) command type giving rise to the invalid state transition.

9. The computer program product of claim 7, wherein the computer usable program code for evicting comprises computer usable program code for evicting a corresponding local cache directory entry for the cache line.

* * * * *